United States Patent Office

Re. 26,125
Reissued Dec. 13, 1966

26,125
REAGENTS AND ANALYSIS OF NITROGEN

Albert L. Chaney, 1347 Andenes Drive, Glendale, Calif.

No Drawing. Original No. 3,119,751, dated Jan. 28, 1964, Ser. No. 193,332, May 8, 1962. Application for reissue Jan. 24, 1966, Ser. No. 526,319
22 Claims. (Cl. 195—103.5)

Matter enclosed in heavy brackets [ ] appears in the original patent but forms no part of this reissue specification; matter printed in italics indicates the additions made by reissue.

This invention relates to a method for the analytical determination of nitrogen. In one of its aspects this invention relates to the chemical determination of urea nitrogen in blood serum or plasma and in urine.

This application is a continuation-in-part of my copending application Serial Number 96,726, filed March 20, 1961, now abandoned.

There are available several methods which are routinely employed for the determination of urea in biological fluids such as serum, plasma or urine. In the most commonly used method urea is hydrolyzed to ammonium carbonate by means of the enzyme urease in the presence of a buffer solution. Ammonia is liberated from the carbonate salt by the addition of sodium borate and then distilled into 0.05 N hydrochloric acid. The amount of nitrogen present is then determined colorimetrically after nesslerization. This procedure is described in detail in the Manual of Clinical Laboratory Methods, Fourth Edition, by Opal Hepler, publisher, Charles C. Thomas, Springfield, Illinois.

Another commonly employed method for the determination of urea in biological fluids depends upon the measurement of the yellow pigment formed by condensing diacetyl with urea in a protein free filtrate of the fluid.

In an attempt to devise a method which had greater precision than did the techniques using Nessler's reagent or diacetyl and which concomitantly required smaller sample specimens, Fawcett and Scott improved upon known colorimetric techniques involving the reaction of ammonia with sodium phenate and hypochlorite to produce a blue color. The Fawcett and Scott technique is reported in J. Clin. Path. (1960), 13:156. This technique, although useful, has certain limitations which have precluded its adoption as a routine analytical tool. In this technique the concentration of reagents is critical. Furthermore, several separate reagents are required. This multiplicity of reagents is of some consequence since time is a critical factor in the technique. If the Fawcett and Scott color reagents are not added promptly in sequence, the final optical density is appreciably diminished. Such a happenstance precludes the simultaneous analysis of a large number of specimens and greatly limits the practicality of the procedure. Also, certain of the Fawcett and Scott reagents are unstable, further limiting the utility of the procedure.

It is an object of the present invention to provide, for the determination of urea in biological fluids, a method which is highly accurate, rapid, requires minimal quantities of specimen fluid and laboratory equipment and which is characterized by the stability of the reagents employed and by the lack of criticality of the time of addition of the reagents.

It is a further object to provide new and novel analytical reagents for the determination of urea in biological fluids.

It is another object to provide, for the determination of urea in biological fluids, a compact analytical reagent unit which is so constituted that it can be transported readily and safely without the risk of reagent malfunction, thereby facilitating analytical determinations under circumstances which would otherwise preclude or limit such determinations.

Other objects and advantages will become apparent from the following detailed discussion of the methodology and materials employed in the practice of the invention.

In one of its aspects, this invention relates to the determination of urea in biological fluids through the hydrolysis of urea by the enzyme urease, the reaction of ammonia under alkaline conditions and in the presence of nitroprusside with phenol and hypochlorite to produce a blue color, and the colorimetric quantitation of the urea present in the specimen fluid.

The materials which form a part of and which are employed in this aspect of the practice of this invention are buffered urease, a mixture of solidified phenol and nitroprusside and alkaline hypochlorite. These reagents in this form are stable for extended periods of time. They, of course, are placed in solution and diluted for use in the analytical procedures of the invention.

In its broader aspects, this invention relates to the determination of ammonia nitrogen generally. The materials and techniques employed in the practice of this broader aspect are the same as those used for the determination of urea except, of course, that the use of urease is not necessary in this broader application.

Urease preparations in states of greater or lesser purity are readily available commercially. The urease employed in the examples of this invention had an activity of from 800 to 1000 Sumner units per gram as measured at 30° C. When employed in the methods of the invention the urease is put into solution. The solution is buffered to a pH which favors enzyme activity and stability, using conventional buffers such as monopotassium dihydrogen phosphate and disodium monohydrogen phosphate. Particularly advantageous results are realized when a chelating agent such as ethylene diamine tetraacetic acid (EDTA) is employed as the buffer.

The mixture of solidified phenol and nitroprusside contributes particularly significantly to the present invention. In analogous procedures which preceded this invention, solutions of sodium phenate and sodium nitroprusside were employed as reagents. Both of these materials are unstable in alkaline solution and the efficacy of the reagents tending to diminish appreciably over relatively short periods of time. In accordance with this invention, these reagents are modified and combined to form a single reagent which has unique and surprising characteristics. Since nitroprusside is unstable in the presence of free water, decomposing to form colored substances which interfere with colorimetry, this reagent is so constituted that it contains no such water. In a preferred embodiment, solid phenol is liquified by heating and is combined in this liquified state with nitroprusside. The nitroprusside may either be in the form of a single crystal or in particulate form. Alternatively, the phenol and nitroprusside may be combined by physical admixture of the constituents as solids, e.g., in particulate form, under conditions of admixture and storage such that essentially anhydrous conditions maintain, to thereby preclude injurious reagent degradation on prolonged storage.

The function of the nitroprusside is as a catalyst for the color reaction; the rate of reaction will be increased in the presence of larger amounts of the catalyst and decreased in the presence of smaller amounts. The relative amount of catalysts to phenol by weight may be as little as one part catalyst to 2000 parts of phenol or as great as one part of catalyst to 40 parts of phenol. Optimum conditions maintain when the concentrated reagent contains about 5 grams of phenol and 25 mg. of sodium nitroprusside. This concentrated reagent in the practice of the methods of this invention is put into aqueous solution and diluted for use. It will be understood, however, that the quantity of nitroprusside in the compositions and methods of the invention can vary appreciably, there being required only an amount such that the catalytic activity of the nitroprusside will not be undesirably impaired when the reagent is employed in the practice of the invention. Although in the preferred embodiment, referred to in the preceding paragraph, this concentrated reagent may contain small amounts of water, e.g., 0.1 ml. of water per 5 grams of phenol, this water is physically occluded by the solidified phenol and is unavailable for contact with the nitroprusside. The reagent is, therefore, essentially anhydrous under these conditions.

Alternatively the phenol and nitroprusside can be provided in separate containers. Under such circumstances, because of its instability in the presence of water, the nitroprusside will preferably be in lyophilized form.

The alkaline hypochlorite solution, because of the nature of other of the reagents of the inventions, has characteristics which distinguish it from the alkaline hypochlorite solutions of the prior art analogous practices. It will be recognized that in the practice of this invention, one of the reagents provided in solid phenol, in contradistinction to prior art practices wherein the reagent provided was sodium phenate. In the practice of the procedures of the invention, the phenol appears as an alkali metal salt. Therefore, provision is made in the reagents of this invention for the ultimate conversion of the phenol to an alkali metal salt. This is accomplished by providing in the alkaline hypochlorite solution a sufficient molar excess of alkali cations to match the molarity of the phenol and to convert the phenol to the appropriate phenate salt in solutions sufficiently dilute to permit the phenol to become solubilized and, therefore, capable of forming salts. It will be readily apparent that alkali metal salts such as sodium or potassium hydroxide, carbonate, or phosphate will provide the requisite alkalinity. Sodium hydroxide, however, is preferred for use in the preparation of the compositions and in the procedures of the invention. When sodium hydroxide is employed, the ratio of hypochlorite by weight to sodium hydroxide by weight may be as little as 1:100 or as great as 1:3; the optimum ratio being 1:12. For convenience of use, this concentrated reagent of the invention in its preferred form is prepared by adding to 100 ml. of water 1.5 grams of sodium hypochlorite and 18.0 grams of sodium hydroxide. Fourteen ml. of this solution provides sufficient alkalinity to convert five grams of phenol to sodium phenate. In the practice of the procedures of the invention, this concentrated solution will, of course, first be made more dilute by the addition of water.

In a commercial embodiment of the invention, the concentrated buffered urease, phenol-nitroprusside, and alkaline hypochlorite reagents are contained in individual vials with one vial of each reagent being packaged within a container, e.g., a paperboard box, which is capable of receiving such vials and protecting them against breakage when the container and its contents are transported by customary shipping means such as air or rail freight. Containers of this character, of course, are standard articles of commerce and, as such, form no part of this invention. Only when these containers have within them the concentrated reagents of this invention are they encompassed by this invention. It will be understood that such containers may contain less than all three of the concentrated reagents of the invention, e.g., the phenol-nitroprusside and alkaline hypochlorite reagents, and still be within the scope of the invention.

In the use of the above reagents in the practice of the procedures of the invention, it is important that certain of the reagents be added in the proper sequence. Of course, the urease is the first reagent used. It is this reagent which converts the nitrogen contained in the urea into ammonia nitrogen, in which form it will react with sodium phenate and hypochlorite. Once the conversion to ammonia has occurred, the remaining reagents are added sequentially as follows. The alkali metal nitroprusside and the phenol are added either concurrently or sequentially, it making little or no difference which precedes the other. The alkaline hypochlorite solution is then added with the resultant color development. The ratio by weight of phenol to sodium hydroxide (as furnished by the alkaline hypochlorite solution) is from about 1:1 to about 3:1, the optimum ratio being 2:1. If this order of addition is followed, it is not necessary that the color reagents be added promptly after each other. Delays in the addition of the alkaline hypochlorite reagent of as long as two or more hours have not been observed to appreciably alter either the intensity or the peak point of optical density of the color. The lack of criticality in the time of addition of the reagents is of considerable practical significance since it permits determinations to be made upon large numbers of samples without the necessity of continuously repeating the addition of one of the reagents after having used other of the reagents.

A further advantage resulting from the use of the reagents and procedures of the invention resides in the apparent lack of difficulties when the same equipment, e.g., a pipette, is used with different ones of the reagent. For example, the color reaction remains unaffected when the same pipette is used for the phenol-nitroprusside reagent and the alkaline hypochlorite reagent. It is only necessary that the pipette be rinsed with water between its use with these different reagents.

Also, within wide limits the concentrations of reagents can be varied with no effect on the intensity or the point of maximum spectral absorption of the color if the solutions to be subjected to colorimetry are diluted to the same final volume.

The interaction of ammonia, alkali metal phenate and alkali metal hypochlorite results in the formation of a chromatic substance which can be related to nitrogen content of a specimen sample by measurement of the color intensity with a suitable instrument, such as a Beckman spectrophotometer or a Klett-Summerson filter photometer. With a spectrophotometer absorption can effectively be measured at 640 millimicrons. A Klett-Summerson Number 54 (green) filter is suitable for use in a filter photometer.

The practice of the present invention is further illustrated by reference to the following detailed example:

EXAMPLE

Preparation of the reagents

These are the stock solutions of the reagents of the invention, as prepared for analytical use from the concentrated, stabilized reagents hereinbefore described.

Buffered urease was prepared by dissolving 250 gm. of EDTA in 3500 ml. of water. The pH of the EDTA solution was adjusted to 6.5 with 54.6 ml. of a 40% sodium hydroxide solution. Fifty gm, of sodium azide was added with stirring until the product was in solution. Thirty-seven and one-half gm. of urease was then dissolved in 1000 ml. of distilled water. The urease was obtained from Sigma Chemical Company, was designated by Sigma as Type II, and had an activity of 1000 Sumner units per gram as measured at 30° C. This solution was added to the above EDTA buffer. The final volume of the combined solutions was brought up to 5000 ml. Following filtration, four ml. of the solution was added to each of the 1250 twenty-five ml. bottles. The material in the bottles was then freeze-dried and the bottles were capped.

Phenol-nitroprusside color reagent was made by dissolving 37.5 gm. of sodium nitroprusside in distilled water and by increasing the volume of 150 ml. by further addition of distilled water. To each of 1250 ten ml. bottles 0.1 ml. of this nitroprusside solution was added. Then 6500 gm. of phenol (Mallinckrodt U.S.P. crystals "Gilt Label") were melted by heating the crystals in a container in a water bath at 80° C. To each of the above bottles there was then added 5.0 ml. of the liquified phenol at 65° C. After cooling and solidification of the phenol, the bottles were capped.

Alkaline hypochlorite reagent was made by adding to 5120 ml. of a 5¼% sodium hypochlorite aqueous solution, 13,000 ml. of a 25% aqueous solution of sodium hydroxide. Fourteen ml. of this solution were then added to each of 1250 twenty ml. vials which were then capped.

Diagnostic test

Ammonia-free water was used for the preparation of all reagents as follows:

(a) Buffered urease:
  (1) The contents of the above characterized vials of buffered urease were reconstituted by the addition of 20 ml. of distilled water to the vial.
  (2) The reconstituted urease is stable for one month when stored at from 2° to 10° C.
(b) Phenol-nitroprusside color reagent:
  (1) One of the above described vials was filled with water and allowed to stand for 5 minutes to liquify the phenol.
  (2) The contents of the vial were transferred to a 500 ml. container, the vial was rinsed with distilled water to complete the transfer, and the final volume was made up to 500 ml. with distilled water.
  (3) The solution thus obtained is stable for at least one month when stored in glass or plastic containers at from 2° to 10° C.
(c) Alkaline hypochlorite reagent:
  (1) The concentrated alkaline hypochlorite solution from one of the above described vials was transferred to a 500 ml. container, the vial was rinsed with distilled water to complete the transfer, and the final volume was made up to 500 ml. with distilled water.
  (2) This solution is stable for at least six months when stored in glass or plastic at from 2° to 10° C.
(d) A nitrogen standard containing 15 mg. of nitrogen per 100 ml. was prepared by dissolving 70.7 mg. of analytical grade ammonium sulfate in 100 ml. of distilled water.

The test was performed on serum. It may also be performed on plasma or diluted urine. A 1:50 dilution of urine will usually suffice; greater or less dilution may be required to bring the concentration into an appropriate range for colorimetry.

(1) Two-tenths ml. of buffered urease solution was placed in each of a series of test tubes for blank, standard and unknown.

(2) To the appropriate tubes (except the blank) was added 0.02 ml. of standard and 0.02 ml. of a serum specimen, the urea content of which was unknown (this specimen is referred to as the "unknown") using a hemoglobin pipette with "washout" procedure.

(3) These tubes were maintained at 37° C. by placing them in an incubator for 15 minutes for conversion of the urea to ammonia. (Alternatively, the tubes can be maintained at room temperature for 30 minutes in this step and the following step 5.)

(4) To each tube (including the blank) was added in the following order:

(a) 5 ml. phenol color reagent
(b) 5 ml. alkaline hypochlorite reagent and the contents of each tube were promptly mixed, using an inert material, Saran (Dow), as a cover for the tubes to prevent contamination.

(5) The tubes were replaced in the incubator at 37° C. for 15 minutes for color development.

(6) The absorbance was read using a Beckman spectrophotometer at 640 millimicrons.

Calculations

When measured by a spectrophotometer, the absorbance, corrected for the blank, is directly proportional to the ammonia nitrogen concentration. The data obtained from the analysis above described were employed to calculate the urea nitrogen of the unknown using the following formulation:

$$\frac{\text{Absorbance of unknown—absorbance of blank}}{\text{Absorbance of standard—absorbance of blank}} \times \text{concentration of standard (mg./100 ml.)} = \text{urea nitrogen of unknown (mg./100 ml.)}$$

The urea nitrogen content of the unknown of this example was found by this procedure to be 15 mg./100 ml. of serum.

As a cross check the urea nitrogen content of the unknown of this example was determined by the standard nesslerization technique described in Manual of Clinical Laboratory Methods. By the nesslerization technique, the urea nitrogen content of the unknown was also found to be 15 mg./100 ml. of serum.

It is further noted that this colorimetric reaction can be used for the determination of ammonia nitrogen in a variety of fluids or solutions provided that, after adding the phenol color reagent, an alkali hypochlorite reagent is added in sufficient quantities to neutralize any initial acidity of the solution and to provide sufficient excess alkali to convert the phenol to the alkali metal salt. For example, in the determination of nitrogen in a so-called Kjeldahl digest, the presence of appreciable quantities of protein or of salts such as sodium chloride or sulfate will not appreciably affect the color reaction.

While in the foregoing specification, a detailed description of embodiments of the invention has been set forth for the purpose of illustration, it will be apparent to those skilled in the art that many modifications in the details of these embodiments may be made without departing from the spirit and principles of the invention.

What is claimed is:

1. A reagent combination for the analysis of urea nitrogen in biological fluids which comprises a first vial of buffered urease, a second vial of essentially anhydrous phenol and an alkali metal salt of nitroprussic acid, the ratio by weight of the said alkali metal salt to the said phenol being from 1:200 to 1:40, and a third vial of an aqueous solution of alkali metal hypochlorite, there being a sufficient excess alkalinity in the said aqueous solution such that when said alkalinity is calculated on a sodium hydroxide basis, the ratio by weight of the phenol in the said second vial to the sodium hydroxide is from about 1:1 to about 3:1.

2. The reagent combination of claim 1 in which the said alkali metal hypochlorite is sodium hypochlorite and the said excess alkalinity is provided by sodium hydroxide.

3. A reagent combination for the analysis of urea nitrogen in biological fluids which comprises a first vial of buffered urease, a second vial of essentially anhydrous phenol, a third vial of anhydrous alkali metal nitroprusside, the ratio by weight of the said alkali metal nitroprusside to the said phenol being from 1:200 to 1:40, and a fourth vial of an aqueous solution of alkali metal hypochlorite, there being a sufficient excess alkalinity in the said aqueous solution such that when said alkalinity is calculated on a sodium hydroxide basis, the ratio by weight of the phenol in the second vial to the sodium hydroxide is from about 1:1 to about 3:1.

4. The reagent combination of claim 3 in which the said alkali metal hypochlorite is sodium hypochlorite and the said excess alkalinity is provided by sodium hydroxide.

5. A reagent combination for the analysis of urea nitrogen in biological fluids comprising a first vial of essentially anhydrous phenol and an alkali metal salt of nitroprussic acid, the ratio by weight of the said alkali metal salt to the said phenol being from 1:200 to 1:40, and a second vial of an aqueous solution of alkali metal hypochlorite, there being a sufficient excess alkalinity in the said aqueous solution such that when said alkalinity is calculated on a sodium hydroxide basis the ratio by weight of the phenol in the first vial to the sodium hydroxide is from about 1:1 to about 3:1.

6. The reagent combination of claim 5 in which the said alkali metal hypochlorite is sodium hypochlorite and the said excess alkalinity is provided by sodium hydroxide.

7. A method for the analysis of urea nitrogen in biological fluids comprising the sequential steps of first adding to said biological fluid buffered urease to thereby convert the urea nitrogen in said biological fluids to ammonia nitrogen in solution, second, concurrently adding to said solution a mixture of phenol and an alkali metal nitroprusside, the ratio by weight of the said alkali metal nitroprusside to the said phenol being from 1:200 to 1:40, and, third, adding to said solution an alkali metal hypochlorite formulation which contains a sufficient excess of alkali metal cations such that when calculated on a sodium hydroxide basis the ratio by weight of the phenol to the sodium hydroxide is from about 1:1 to about 3:1.

8. A method for the analysis of urea nitrogen in biological fluids comprising the sequential steps of first adding to said biological fluid buffered urease to thereby convert the urea nitrogen in said biological fluids to ammonia nitrogen in solution, second, adding phenol to said solution, third, adding an alkali metal nitroprusside to said solution, the ratio by weight of the said alkali metal nitroprusside to the said phenol being from 1:200 to 1:40, and, fourth, adding to said solution as alkali metal hypochlorite formulation which contains a sufficient excess of alkali metal cations such that when calculated on a sodium hydroxide basis the ratio by weight of the phenol to the sodium hydroxide is from about 1:1 to about 3:1.

9. The method of claim 8 in which the order of addition of the phenol and the alkali metal nitroprusside is reversed.

10. The method of claim 7 in which the said alkali metal is sodium.

11. The method of claim 8 in which the said alkali metal is sodium.

*12. A reagent combination for the analysis of urea nitrogen in biological fluids which comprises a first vial of buffered urease, a second vial of essentially anhydrous phenol and an alkali metal salt of nitroprussic acid, the ratio by weight of the said alkali metal salt to the said phenol being from 1:2000 to 1:40, and a third vial of an aqueous solution of alkali metal hypochlorite, there being a sufficient excess alkalinity in the said aqueous solution such that when said alkalinity is calculated on a sodium hydroxide basis, the ratio by weight of the phenol in the said second vial to the sodium hydroxide is from about 1:1 to about 3:1.*

*13. The reagent combination of claim 12 which the said alkali metal hypochlorite is sodium hypochlorite and the said excess alkalinity is proivded by sodium hydroxide.*

*14. A reagent combination for the analysis of urea nitrogen in biological fluids which compirses a first vial of buffered urease, a second vial of essentially anhydrous phenol, a third vial of anhydrous alkali metal nitroprusside, the ratio by weight of the said alkali metal nitroprusside to the said phenol being from 1:2000 to 1:40, and a fourth vial of an aqueous solution of alkali metal hypochlorite, there being a sufficient excess alkalinity in the said aqueous solution such that when said alkalinity is calculated on a sodium hydroxide basis, the ratio by weight of the phenol in the second vial to the sodium hydroxide is from about 1:1 to 3:1.*

*15. The reagent combination of claim 14 in which the said alkali metal hypochlorite is sodium hypochlorite and the said excess alkalinity is provided by sodium hydroxide.*

*16. A reagent combination for the analysis of urea nitrogen in biological fluids comprising a first vial of essentially anhydrous phenol and an alkali metal salt of nitroprussic acid, the ratio by weight of the said alkali metal salt to the said phenol being from 1:2000 to 1:40, and a second vial of an aqueous solution of alkali metal hypochlorite, there being a sufficient excess alkalinity in the said aqueous solution such that when said alkalinity is calculated on a sodium hydroxide basis the ratio by weight of the phenol in the first vial to the sodium hydroxide is from about 1:1 to about 3:1.*

*17. The reagent combination of claim 16 in which the said alkali metal hypochlorite is sodium hypochlorite and the said excess alkalinity is provided by sodium hydroxide.*

*18. A method for the analysis of urea nitrogen in biological fluids comprising the sequential steps of first adding to said biological fluid buffered urease to thereby convert the urea nitrogen in said biological fluids to ammonia nitrogen in solution, second, concurrently adding to said solution a mixture of phenol and an alkali metal nitropursside, the ratio by weight of the said alkali metal nitroprusside to the said phenol being from 1:2000 to 1:40, and, third, adding to said solution an alkali metal hypochlorite formulation which contains a sufficient excess of alkali metal cations such that when calculated on a sodium hydroxide basis the ratio by weight of the phenol to the sodium hydroxide is from about 1:1 to about 1:3.*

*19. A method for the analysis of urea nitrogen in biological fluids comprising the sequential steps of first adding to said biological fluid buffered urease to thereby convert the urea nitrogen in said biological fluids to ammonia nitrogen in solution, second, adding phenol to said solution, third, adding an alkali metal nitroprusside to said solution, the ratio by weight of the said alkali metal nitroprusside to the said phenol being from 1:2000 to 1:40, and, fourth, adding to said solution as alkali metal hypochlorite formulation which contains a sufficient excess of alkali metal cations such that when calculated on a sodium hydroxide basis the ratio by weight of the phenol to the sodium hydroxide is from about 1:1 to about 3:1.*

*20. The method of claim 19 in which the order of addition of the phenol and the alkali metal nitroprusside is reversed.*

*21. The method of claim 18 in which the said alkali metal is sodium.*

*22. The method of claim 19 in which the said alkali metal is sodium.*

References Cited by the Examiner

The following references, cited by the Examiner, are of record in the patented file of this patent or the original patent.

UNITED STATES PATENTS 2,990,338 6/1961 Gibson.
3,009,862 11/1961 Dobrick.

OTHER REFERENCES

Fawcett and Scott: "A Rapid and Precise Method for the Determination of Urea," Journal Clin. Path., March 1960, vol. 13.

A. LOUIS MONACELL, *Primary Examiner.*

ALVIN E. TANENHOLTZ, *Examiner.*